United States Patent [19]

Isomura

[11] 4,118,776
[45] Oct. 3, 1978

[54] NUMERICALLY CONTROLLED MACHINE COMPRISING A MICROPROGRAMMABLE COMPUTER OPERABLE WITH MICROPROGRAMS FOR MACROINSTRUCTIONS AND FOR INHERENT FUNCTIONS OF THE MACHINE

[75] Inventor: Masayoshi Isomura, Tokyo, Japan

[73] Assignee: Nippon Electric Company, Ltd., Tokyo, Japan

[21] Appl. No.: 824,684

[22] Filed: Aug. 15, 1977

Related U.S. Application Data

[63] Continuation-in-part of Ser. No. 706,044, Jul. 16, 1976, abandoned.

[30] Foreign Application Priority Data

Jul. 17, 1975 [JP] Japan .................................. 50/87711

[51] Int. Cl.² .......................... G05B 19/18; G06F 9/16
[52] U.S. Cl. .................................... 364/474; 318/569; 364/107; 364/200
[58] Field of Search ... 364/100, 107, 474, 200 MS File, 364/900 MS File; 318/569, 570

[56] References Cited

U.S. PATENT DOCUMENTS

| | | | |
|---|---|---|---|
| 3,215,987 | 11/1965 | Terzian | 364/200 |
| 3,585,600 | 6/1971 | Saltini | 364/200 |
| 3,599,176 | 8/1971 | Cordero, Jr. et al. | 364/200 |
| 3,636,522 | 1/1972 | Buschmann et al. | 364/200 |
| 3,736,563 | 5/1973 | Beckinger et al. | 364/200 |
| 3,990,054 | 11/1976 | Perlowski | 364/200 |

Primary Examiner—Joseph F. Ruggiero
Attorney, Agent, or Firm—Sughrue, Rothwell, Mion, Zinn and Macpeak

[57] ABSTRACT

With a microprogrammable computer of a numerically controlled machine, macroinstructions are executed in response to a first microprogram. The computer makes the machine carry out its inherent functions, such as interpolation, in response to a second microprogram. Flags may be used to switch sequential execution of the macroinstructions to repeated execution of a portion of the macroinstructions and sequential execution of microinstructions of the second microprogram.

7 Claims, 7 Drawing Figures

NUMERICALLY CONTROLLED MACHINE COMPRISING A MICROPROGRAMMABLE COMPUTER OPERABLE WITH MICROPROGRAMS FOR MACROINSTRUCTIONS AND FOR INHERENT FUNCTIONS OF THE MACHINE

CROSS-REFERENCE TO A RELATED APPICATION:

This is a continuation-in-part application of patent application Ser. No. 706,044 filed July 16, 1976, now abandoned.

BACKGROUND OF THE INVENTION:

This invention relates to a numerically controlled machine comprising a microprogrammable computer.

In general, a numerical controller or a numerical control device for a numerically controlled machine has to carry out a number of operations and functions in order to control the machine. Such functions comprise interpolation, control of servo systems of the known follow-up type, readout of command data, preparatory processing for the interpolation of the read-out data, display of inside data, and sequence control of an operation panel and/or a power board. Among others, the interpolation and the servo system control are essential or basic functions of a numerical control device and have to be carried out to successively produce the results at a high rate of the order of a microsecond. In contrast, the other functions may be executed to bring about the successive results at a relatively low rate of the order of a millisecond. The recent trend is to require a higher rate of carrying out the basic functions into effect.

Heretofore, a numerical control device of a conventional numerically controlled machine has comprised random logics designed in compliance with the respective functions. On the other hand, it has recently turned out to be feasible due to a reduction in the cost to use a small-sized electronic digital computer, such as a minicomputer or a microcomputer, as a numerical control device. In fact, various computerized numerical control devices are in practical use. It is, however, to be pointed out that the computer sequentially deals with various data in compliance with a program and that the rate at which the results of the basic functions are obtained is insufficient even with a small-sized computer of the highest available speed in contrast to a numerical control device comprising random logics whereby it is possible to deal with various data in parallel. As a result, it has been inevitable either to be satisfied with coarse interpolation with the basic functions deteriorated or to resort with the cost raised to an additional hardware circuit, such as a linear interpolator, for carrying out the basic functions at a high rate.

In the meantime, a microprogrammable or microprogrammed computer has been developed which comprises a memory in a control section, usually called a control memory or storage in contrast to a main memory and an external memory. Programs, called microprograms, are stored in the control memory to supply control signals to the main memory, an arithmetic unit, and/or I/0 devices. Usual programs stored in the main and/or external memory are named macroprograms. A microprogrammable computer has an excellent flexibility of operation because it is possible to optionally vary architecture of the computer by a mere change in the microprograms. A microprogram comprises a sequence of microinstructions having a greater number of bits to directly control operation of the computer than macroinstructions of a macroprogram. Although the individual microinstructions are executed at a high speed of the order of several hundreds of nanoseconds, a number of microinstructions are necessary in order to execute the macroprogram in usual. A microprogrammable computer therefore has a lower speed of operation than a general computer.

SUMMARY OF THE INVENTION

It is therefore an object of the present invention to provide a numerically controlled machine comprising as a numerical control device a microprogrammable computer of high accuracy, high speed, and low cost.

It is another object of this invention to provide a numerically controlled machine comprising a microprogrammable computer, which needs no additional hardware circuit for raising the speed of operation.

It is to be pointed out here that functions of a numerical control device are capable of being divided into a first and a second group. It is sufficient that the functions of the first group, such as readout of command data and preparatory processing of the read-out data exemplified hereinabove, be carried out to bring about successive results at a low rate of the order of a millisecond. The functions of the second group, such as the interpolation and the servo system control also exemplified hereinabove, should be performed to successively produce results at a high rate of the order of a microsecond.

With a microprogrammable computer used in this invention, the functions of the first group are executed in compliance with a macroprogram under the control of a first microprogram while the functions of the second group are directly carried out in compliance with a second microprogram. Flags are used to call for the second microprogram.

Thus a numerically controlled machine to be put into operation by command data stored in a command store to which the present invention is applicable comprises a machine section, reading means for reading the command store to derive command signals representative of the command data, and a numerical control device responsive to the command data for putting the machine section into operation.

In accordance with this invention, the numerical control device comprises a microprogrammable computer which comprises, in turn, memory means comprising first memory means for storing therein the command data, second memory means for storing therein first results of calculation, and third memory means for storing therein a macroprogram composed of a sequence of macroinstructions. The numerical control device further comprises a control memory for storing a first microprogram composed of a sequence of first microinstructions and a second microprogram composed of a sequence of second microinstructions and control means coupled to the reading means, the first through third memory means, and the control memory for storing in response to the command signals the command data in the first memory means, for executing at a first rate the macroinstructions in response to the first microinstructions to successively derive the first results of calculation from the command data stored in the first memory means and to store the successively calculated first results of calculation in the second memory means, and for executing at a second rate faster than the first rate the second microinstructions to derive second results of calculation from the successively calculated and stored first results of calculation. The numerical control device still further comprises operation means responsive to the second results of calculation for putting the machine section into operation.

Figure 1:
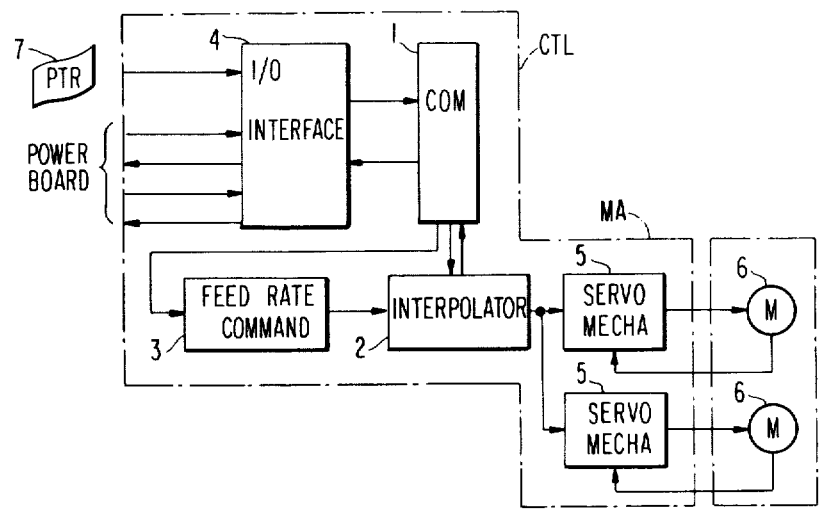
FIG. 1 is a block diagram of a conventional numerically controlled machine comprising an electronic digital computer.

DESCRIPTION OF THE PREFERRED EMBODIMENT:

Referring to FIG. 1, a conventional numerically controlled machine comprising an electronic digital computer 1 as a part of a numerical control device CTL will be described at first for a better understanding of the present invention. The device comprises an interpolator 2 coupled to the computer 1, a feed rate command portion 3 for supplying a sequence of known distribution command pulses to the interpolator 2, an I/0 interface 4, and a plurality of servo mechanisms 5. The device CTL is for numerically controlling a machine section MA of the numerically controlled machine. The machine section MA is exemplified by servo motors 6. The I/0 interface 4 supplies the computer 1 with various command data readout of a command store 7, such as a punched tape, in response to signals supplied from the computer 1. Furthermore, the I/0 interface 4 serves for interchange of signals between the computer and an operation control panel and/or a power board (not shown). The computer 1 carries out preparatory processes on the read-out data to produce the feed rate signal and to successively supply the interpolator 2 with signals representative of normalized end points of those intervals or blocks into which a curve to be followed by a machine tool (not shown) relative to a workpiece (not shown) is preliminarily divided. The interpolator 2 carries out linear interpolation between a current end point and the next previous end point and delivers distribution pulses indicative of interpolated points to the servo mechanism 5 in synchronism with the distribution command pulses. The servo mechanisms 5 supply their output signals to the servo motors 6 to move the machine tool relative to the workpiece. Furthermore, the servo mechanisms 5 receive feed back signals from the motors 6 to make the relative movement between the machine tool and the workpiece follow the interpolated points.

Figure 2:
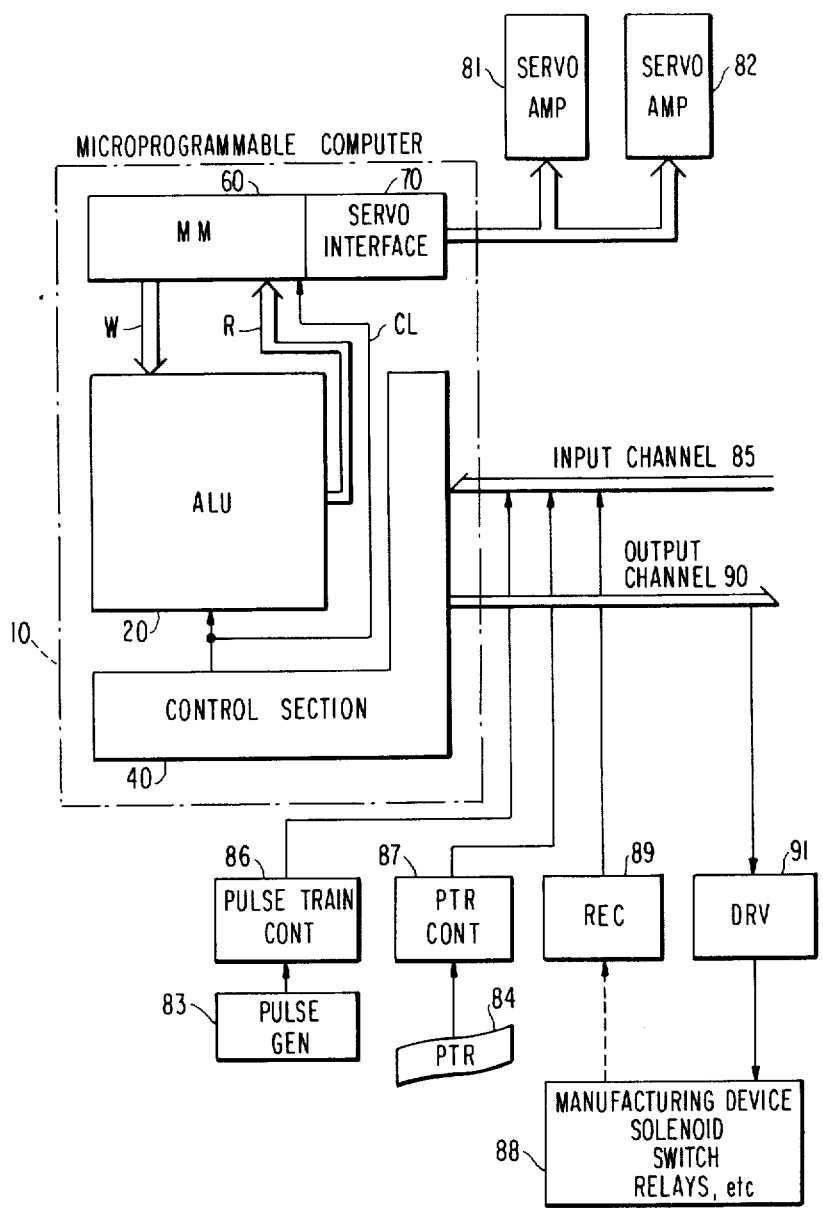
FIG. 2 is a block diagram of a numericaly controlled machine comprising a microprogrammable computer according to a preferred embodiment of the present invention.
Figure 3:
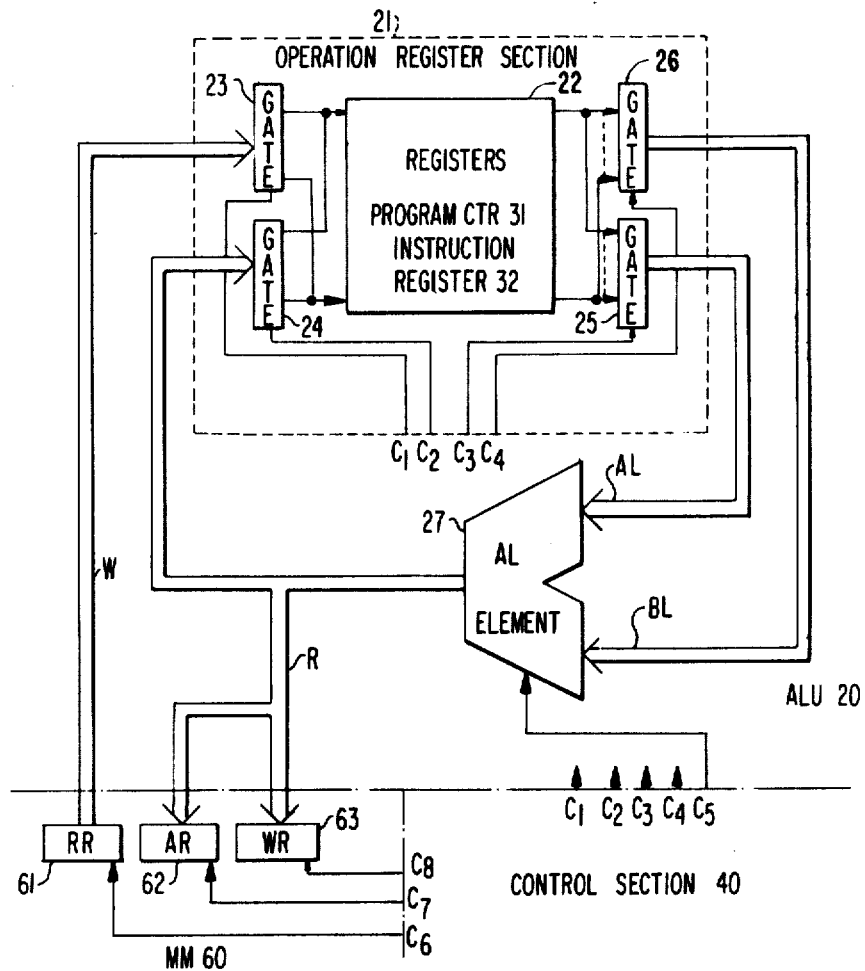
FIG. 3 is a block diagram of an arithmetic logic unit and a main memory of the computer shown in FIG. 2.

Referring now to FIGS. 2 and 3, a numerically controlled machine according to a preferred embodiment of the present invention comprises a microprogrammable computer 10 comprising, in turn, an arithmetical logic unit 20. The unit 20 comprises an operation register section 21 comprising, in turn, a plurality of operation registers 22 represented by a single block, first and second gate groups 23 and 24 serving as two input gate groups for the operation registers 22, third and fourth gate groups 25 and 26 serving as two output gate groups therefor, and an arithmetical logic element 27. Two of the operation registers 22 are used as a macroprogram counter 31 and a macroinstruction register 32, respectively. Each of the gate groups 23–26 consists of a plurality of gates.

Figure 4:
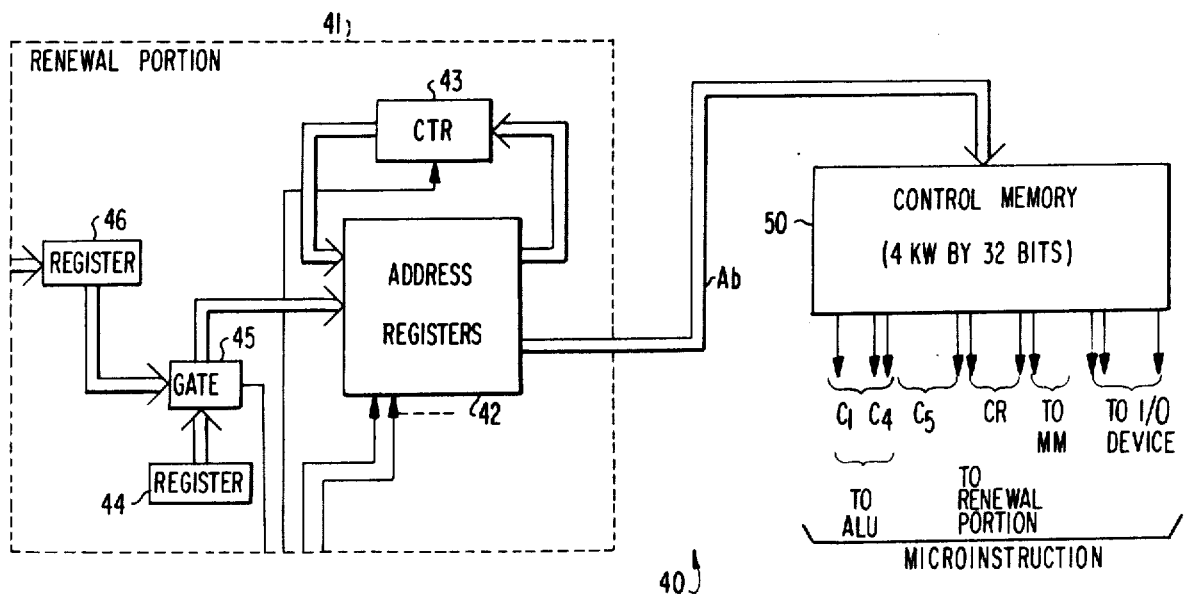
FIG. 4 is a block diagram of a control section of the computer illustrated in FIG. 2.

Referring again to FIGS. 2 and 3 and anew to FIG. 4, the computer 10 comprises a control section 40 comprising, in turn, a control memory address renewal portion 41. The renewal portion 41 comprises a plurality of control memory address registers 42 depicted by a single block, an address counter 43, a start address register 44, an address gate 45 and a jump address register 46 connected as shown. The control section 40 further comprises a control memory 50 having, for example, four thousand control memory addresses for storing microprograms. Each microprogram consists of a sequence of microinstructions starting at a certain start address. As shown in FIG. 4 below the control memory 50, each microinstruction may consist of 32 bits, which are divided into first through fourth control fields and an I/0 device control field. The third control field is labelled CR.

Let it be presumed that the start address of a predetermined or first microprogram is stored in the start address register 44. At the outset of operation, the address gate 45 is enabled so as to supply the start address from the start address register 44 to a predetermined one of the address register 42, which specifies the start address of the control memory 50 for the predetermined microprogram through an address bus Ab. Supplied with the start address, the control memory 50 produces a first microinstruction of the predetermined microprogram. In response to the third control field CR of the first microinstruction, the control section 40 is put into operation to make the counter 43 up-count by one and to make the predetermined one of the address registers 42 specify a next following control memory address. During normal operation, the renewal portion 41 thus makes the control memory 50 consecutively produce microinstructions of the microprograms successively specified by the respective start addresses.

Referring once again to FIGS. 2 through 4, the microprogrammable computer 10 further comprises a main memory 60 having a plurality of main memory cells accessible with reference to main memory addresses. A data area consists of some of the memory cells area for storing results of calculation carried out by the arithmetical logic unit 20 in the manner to be presently described. Some of the main memory cells are for storing macroprograms, namely, usual programs other than the microprograms. Each of the macroprograms consists of a sequence of macroinstructions. The results of calculation may be addresses or other data. The main memory 60 comprises a memory read-out register 61, a main memory address register 62, and a memory write-in register 63. In response to the first control field of each microinstruction, the control section 40 supplies first through fourth control signals $C_1$, $C_2$, $C_3$, and $C_4$ to the first through fourth gate groups 23–26, respectively. The first control signal $C_1$ enables a specific gate of the first gate group 23. Likewise, the second through fourth control signals $C_2$–$C_4$ enable the second through fourth gate groups 24–26. The output gate groups 25–26 thus supply pertinent data from the operation registers 22 to the arithmetical logic element 27 through data buses AL and BL. Depending on the third and fourth control signals $C_3$–$C_4$, data are supplied from one or more operation registers 22 to the arithmetical logic element 27 through data buses AL and/or BL. In response to the second control field of each microinstruction, the control section 40 supplies a fifth control signal $C_5$ to the arithmetical logic element 27 to specify its operation, such as addition, substraction, multiplication, and mere transfer. The element 27 thus carries out calculation, as called herein, on the data supplied thereto to produce a result of calculation. In response to the fourth control field of each microinstruction, the control section 40 supplies sixth through eighth control signal $C_6$, $C_7$, and $C_8$ to the read-out, the main memory address, and the write-in registers 61–63, respectively, through a control signal bus CL (FIG. 2). When the seventh control signal $C_7$ is produced, the address register 62 is loaded with the result of calculation representative of a main memory address through a register read-out bus R. When the first and sixth control signals $C_1$ and $C_6$ are produced, a datum stored in a main memory address specified by the address register 62 is moved from the read-out register 61 to a pertinent one of the operation registers 22 through a register write-in bus W and a pertinent gate of the first gate group 23. In response to the second control signal $C_2$, a pertinent one of the operation registers 22 is loaded with the result of calculation through a relevant gate of the second gate group 24. In response to the eighth control signal $C_8$, the result of calculation is stored through the read-out bus R and the write-in register 63 in a main memory address specified by the address register 62. It is thus possible to regard the operation registers 22 to be a portion of the main memory 60 although depicted as a portion of the arithmetical logic unit 20 in FIG. 3. As is known in the art, use may be made also of external memory or memories (not shown) in addition to the main memory 60.

Referring to FIGS. 2 and 3, the computer 10 further comprises a servo interface 70 accompanying the main memory 60. Besides the computer 10, the numerical control device comprises servo amplifiers 81 and 82. The data written into the main memory 60 are supplied through the interface 70 to the amplifiers 81–82 successively at a predetermined interval, such as 10 microseconds. The amplifiers 81–82 amplify the signals supplied thereto and deliver the amplified signals to the servo motors 6 (FIG. 1) as the distribution pulses. The numerical control device further comprises a pulse generator 83 for generating a sequence of basic pulses, a tape reader 84 for successively reading the command data from a command store 7 as described with reference to FIG. 1, an input channel 85 connected to the control section 40, a pulse train controller 86 responsive to the basic pulses for controlling application to the control section 70 of input channel signals placed on the input channel 85, and a tape reader controller 87 for supplying the read-out command data to the input channel 85. Here, the machine section comprising the servo motors 6 is depicted as a manufacturing device 88 controlled by the control output signals and comprising status elements, such as switches and relays (not shown), for producing status signals representative of those statuses of the machine section which primarily result from control by the distribution pulses. The numerical control device still further comprises a receiver 89 for supplying the status signals to the input channel 85, an output channel 90 connected to the control section 40, and a driver 91 for controlling the status elements in response to output channel signals placed on the output channel 90.

Figure 5:
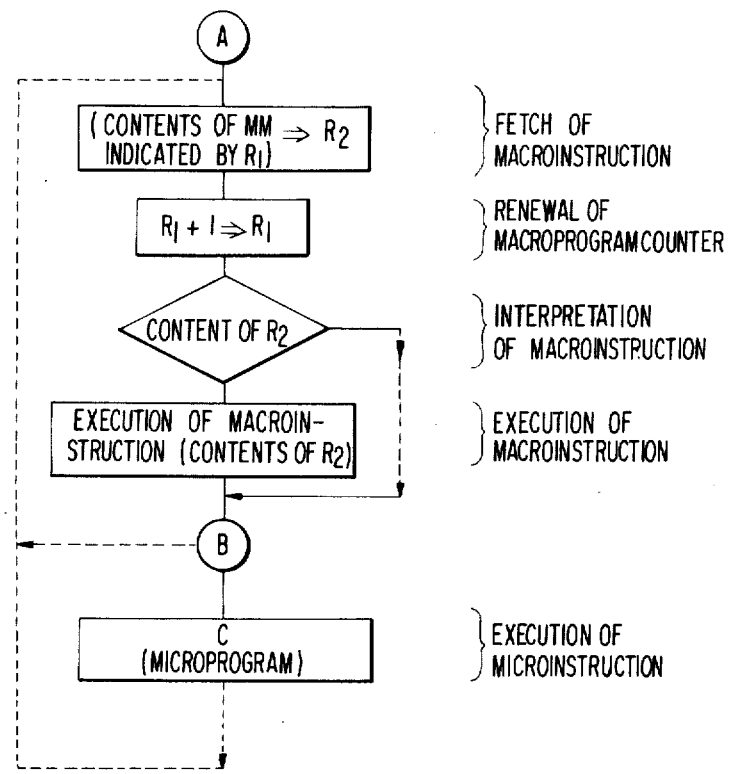
FIG. 5 is a flow chart for generally describing the operation of the computer depicted in FIGS. 2 through 4.

Turning to FIG. 5, the numerical control device illustrated with reference to FIGS. 2 through 4 processes from a first point A to a second point B a macroinstruction of a macroprogram in compliance with a microprogram, herein called an initial or first microprogram composed of a sequence of first microinstructions. At the beginning of fetch operation of the macroinstruction, a microinstruction of the microprogram loads the macroprogram counter 31 in the operation register section 21 with a count $R_1$ representative of a main memory address. The macroinstruction register 32 is loaded with a datum $R_2$ stored in the main memory address indicated by the count $R_1$. The count $R_1$ of the program counter 31 is renewed by addition thereto of unity. In the meantime, another microinstruction makes the arithmetical logic unit 20 check the content $R_2$ of the instruction register 32 to interpret the macroinstruction. If applicable, the macroinstruction is executed in compliance with subsequent microinstructions. If not, the step jumps to the second point B as indicated by a short dotted line. When the macroinstruction is thus processed anyhow to the second point B in compliance with a plurality of microinstructions, operation of a conventional microprogrammed computer returns to the first point A to process that another macroinstruction of the macroprogram which is stored in a next following main memory address indicated by the renewed count of the program counter 31. In this manner, the macroinstructions of the macroprogram are successively executed in cycles.

Further referring to FIG. 5, it is rendered possible by this invention to make the microprogrammable computer 10 execute the microinstructions of a second microprogram C composed of a sequence of second microinstructions as soon as the second point B is reached. After the second microinstruction C is finished, operation of the computer 10 returns to the first point A. When a microprogram, such as C, is executed after each macroinstruction, the macroprogram is processed at a considerably lower speed. It is, however, thereby possible to execute the microprogram C at a high speed after execution of each macroinstruction. More particularly, the macroprogram simultaneously proceeds with the microprogram C. If the simultaneously executed microprogram and macroprogram neither changes those data, such as the counts $R_1$ and the macroinstructions $R_2$, which control the macroprogram nor the data which are usually stored in the main memory 60 and with which the macroprogram has direct access, then the microprograms and the macroprogram are operatively independent of one another. Even if the microprograms and the macroprogram make access to common data, it is possible to execute the macroprogram in synchronism with the microprograms by utilizing known flags. In the latter event, the computer 10 is equivalent to a high-speed and a low-speed computer put into operation independently of each other with data interchanged therebetween. When at least a portion of a macroprogram should be executed at a high speed, it is possible to substitute a microprogram for the macroprogram or its portion and to call the substitution microprogram by a special macroinstruction. It is readily feasible to form the special macroinstruction by a microprogram due to the flexibility of the computer 10.

Figure 7:
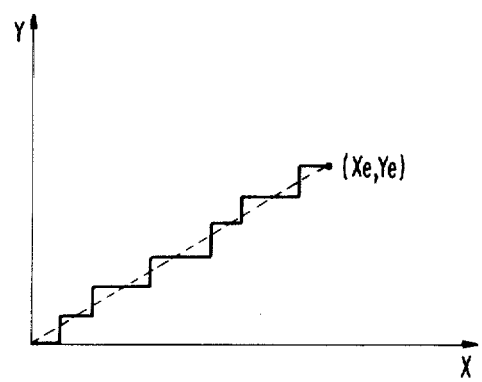
FIG. 7 exemplifies the state of distribution carried out by the numerically controlled machine according to the preferred embodiment.
Figure 6:
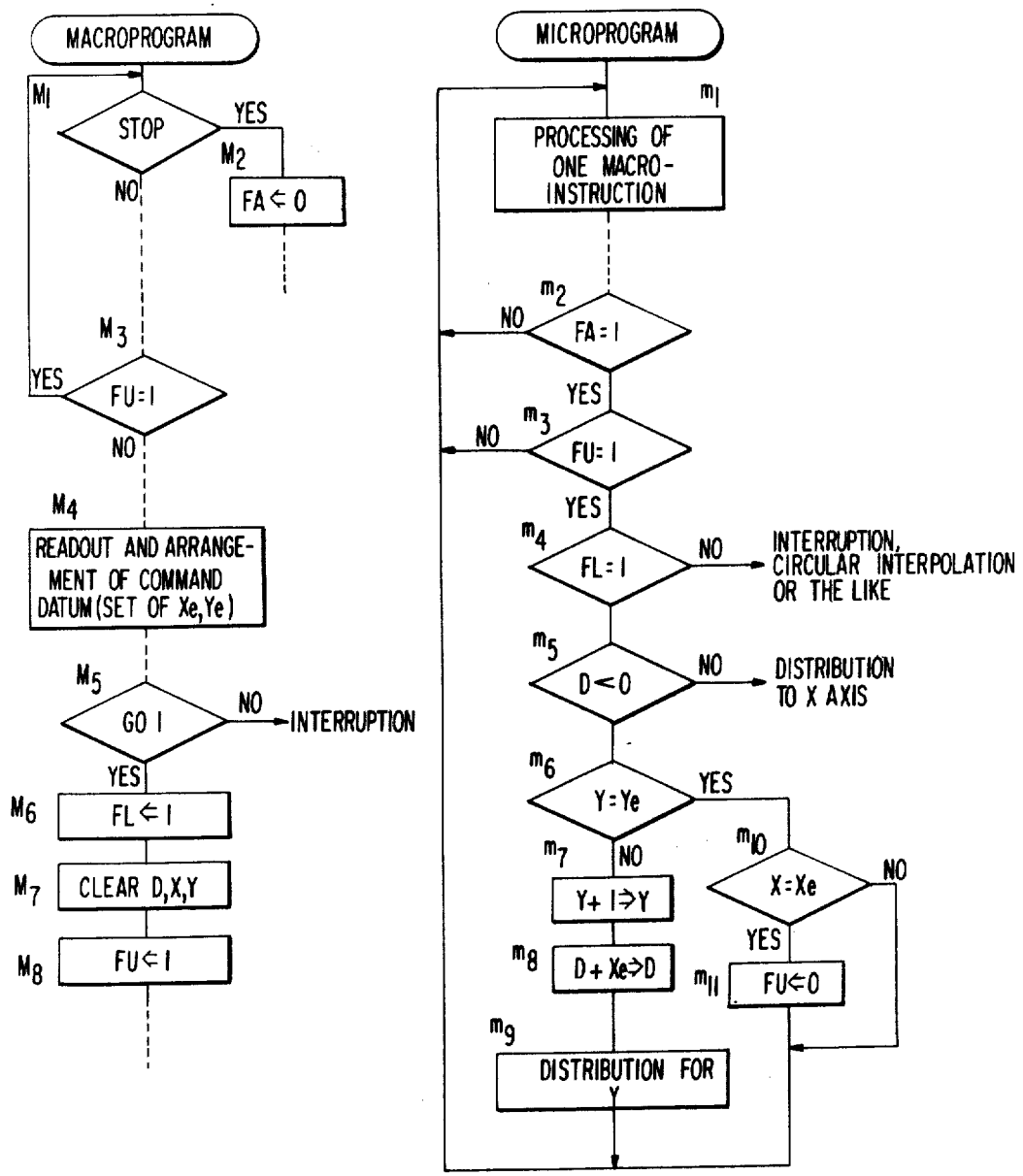
FIG. 6 illustrates a macroprogram and two microprograms to be alternatingly executed by the computer shown in FIGS. 2 through 4.

Turning now to FIGS. 6 and 7, it is assumed that a macroprogram is stored in the main memory 60 of the numerical control device starting at a certain start main memory address for making the tape reader 84 read command data, for storing the read-out data in first predetermined memory cells of the memory means, preparatorily processing the read-out data to derive normalized end point data for a current end point and to store the same in second predetermined memory cells, and other processes, that a microprogram for interpolation, such as linear interpolation, is stored in the control memory 50 as the above-mentioned second microprogram besides the first microprogram mentioned also hereinabove, and that control of the numerically controlled machine is on an X–Y plane towards the current end point from a previous end point. The interpolation is carried out by making the control device produce distribution pulses for the X and Y axes so as to make the controlled machine follow a straight line given by:

$$D = Xe \cdot Y - Ye \cdot X = 0, \quad (1)$$

where $D$ represents a linear interpolation datum for use as a reference and $Xe$ and $Ye$ represents a set of normalized end points calculated as described later from the command data stored in the first predetermined memory cells. It is always possible to place the straight line in the first quadrant of the $X$-$Y$ plane (FIG. 7) by rotating, otherwise, the $X$-$Y$ plane during the preparatory processes. At an instant when distribution, namely, successive production of the distribution pulses, is carried out $X_i$ and $Y_j$ times for the X and Y axes, respectively, where $i$ and $j$ represent zero or positive integers, the second microprogram makes in the manner detailed hereunder the arithmetical logic unit 20 calculate an instantaneous reference value $D_{i,j}$ which is equal to the reference value given by Equation (1) with substitution of $X_i$ and $Y_j$ for X and Y and may not necessarily be equal to zero. The instantaneous reference value $D_{i,j}$ is stored in third predetermined memory cells and checked by the arithmetical logic unit 20. If the instantaneous reference value $D_{i,j}$ is not less than zero, the unit 20 produces a distribution pulse for the X-axis. The value of $X_i$ therefore increases by one into $X_{i+1}$ while the value of $Y_j$ is left unchanged. Thus, the value of $X_i$ and $Y_j$ are also linear interpolation data. The unit 20 now calculates and checks a new instantaneous reference value $D_{i+1,j}$ according to:

$$D_{i+1,j} = Xe \cdot Y_j - Ye \cdot X_{i+1} = D_{i,j} - Ye$$

under the circumstances. If the first-mentioned instantaneous reference value $D_{i,j}$ is less than zero, the unit 20 produces a distribution pulse for the Y axis. The value of $Y_j$ therefore increases by one into $Y_{j+1}$ while the value of $X_i$ remains unchanged. The unit 20 now calculates another new instantaneous reference value $D_{i,j+1}$, which is given by:

$$D_{i,j+1} = Xe \cdot Y_{j+1} - Ye \cdot Y_i = D_{i,j} + Xe.$$

In order to synchronize the macroprogram with the microprograms, use is made of several flags, such as a distribution allowance flag FA, a linear distribution flag FL, an under-distribution flag FU, and a "Go to 1" flag GO 1. The data area of the main memory 60 which may be preselected ones of the operation registers 22, has predetermined addresses for the value of Xe, Ye, FA, and known stop data. Furthermore, other predetermined addresses are assigned to the value of $X_i$, $Y_j$, FL, FU, and GO 1. Alternatively, predetermined ones of the operation registers 22 are assigned to the latter values. For convenience of further description, let the macroinstructions of the macroprogram be divided into a sequence of first macroinstruction and another sequence of second macroinstructions.

At a first stage $m_1$ of the first microprogram, a microinstruction makes the arithmetical logic unit 20 execute a first macroinstruction of the macroprogram. At a first stage $M_1$ of the macroprogram depicted in FIG. 6 as the above-mentioned first macroinstruction, the unit 20 checks the stop data. If at least one of the stop data shows necessity of an emergency stop and/or the like, the first macroinstruction substitutes at a second stage $M_2$ of the macroprogram of a logic "0" datum for a logic "1" datum with which a first predetermined one of the operation registers 22 is preliminarily loaded. The microprogram proceeds to its second stage $m_2$ to make the arithmetical logic element 27 check the first predetermined operation register and move the datum stored in the address for the distribution allowance flag FA to the register. If the register is loaded with the logic "0" datum at the second stage $m_2$ of the microprogram, the microprogram returns from the second stage $m_2$ to its first stage $m_1$ to make the unit 20 repeatedly execute the first macroinstruction until the stop becomes unnecessary, when the logic "1" value remains in the predetermined operation register. When the register is loaded with a logic "1" datum in any event, the microprogram proceeds to its third stage $m_3$ to move the datum from the address for the under-distribution flag FU to a second predetermined one of the operation register 22 and to make the element 27 check the register. This operation is also indicated by a third stage $M_3$ of the macroprogram. Inasmuch as the flag FU is not logic "1" in this stage of execution of the programs, the microprogram returns from its third stage $m_3$ to its first stage $m_1$ to make the unit 20 execute a second macroinstruction at a fourth stage $M_4$ of the macroprogram, namely, a first of the second macroinstructions, to read and preparatorily process the command data and substitute in the second predetermined main memory cells the current normalized end point values Xe and Ye for previous values. On the other hand, the microprogram again returns from its third stage $m_3$ to its first stage $m_1$ to make the unit 20 execute a second of the second macroinstruction at a fifth stage $M_5$ of the macroprogram to check the "Go to 1" flag GO 1. If the flag GO 1 is rendered logic "0" for some reason or another, the macroprogram interrupts the linear interpolation operation. Inasmuch as the flag GO 1 is now logic "1", the macroprogram proceeds to its sixth stage $M_6$, or a third of the second macroinstructions, to make the unit 20 move a logic "1" datum from a pertinent one of the operation registers 22 to the address for the linear distribution flag FL. The microprogram once again returns from its third stage $m_3$ to its first stage $m_1$. In this manner, the macroprogram proceeds to a seventh stage $M_7$, or a fourth of the second macroinstructions, to make the element 27 clear those of the operation registers 22 which are assigned to the values of $D_{i,j}$, $X_i$, and $Y_j$. The macroprogram proceeds to its eighth stage $M_8$, namely, a fifth of the second macroinstructions, to move a logic "1" datum from a pertinent one of the operation registers 22 to the address for the under-distribution flag FU.

It is now rendered possible for the first microprogram to proceed to a first of the second microinstructions, namely, to a fourth stage $m_4$ of the whole microprogram. If the linear distribution flag FL remains logic "0" for some reason or another, the second microprogram is interrupted so that remaining ones of the second microinstructions may no more be executed. Inasmuch as the flag FL is logic "1" now, the microprogram proceeds to its fifth stage $m_5$ where the arithmetical logic element 27 checks the instantaneous reference value D (the suffixes omitted hereafter for simplicity) stored one of the above-mentioned third main memory cells that is named a "D register" hereunder. Similarly, the registers for the values of $X_i$ and $Y_j$ are called an X and a Y register, respectively. If the value D is not less than zero, the distribution is carried out along the X axis. It is now presumed that the value D is less than zero. At a sixth stage $m_6$, the arithmetical logic unit 20 compares the present Y position given through the input channel 85 with the current Y end point Ye. If the former is less than the latter, the element 27 adds at a seventh stage $m_7$ to the value of Y with which the Y register is loaded. Thereafter, the element 27 adds at an eighth stage $m_8$ the value of Xe to the present instantaneous reference value D. At a ninth stage $m_9$, the unit 20 makes the main memory 60 deliver a Y distribution pulse to the Y servo amplifier that may be the servo amplifier 82. The microprogram returns from the ninth stage $m_9$ to the first stage $m_1$. If the present Y position becomes equal to the current Y end point Ye, the microprogram proceeds from the sixth stage $m_6$ to a tenth stage $m_{10}$ where the unit 20 compares the present X position with the current X end point Xe. When the former is less than the latter, the microprogram returns from the tenth stage $m_{10}$ to the first stage $m_1$. If the former becomes equal to the latter, the element 27 moves at an eleventh stage $m_{11}$, or a predetermined one of the second microinstructions that stands at the end of the sequence, a logic "0" value from a pertinent one of the operation registers 22 to the address for the under-distribution flag FU with the microprogram put back from the eleventh stage $m_{11}$ to the first stage $m_{11}$. It is to be noted here that the macroprogram returns from its third stage $M_3$ to its first stage $M_1$ without proceeding to its fourth stage $M_4$ because the under-distribution flag FU is kept at the logic "1" value before execution of the eleventh stage $m_{11}$ of the microprogram. If the value D is found to be less than zero at the fifth stage $m_5$ of the microprogram, the microprogram proceeds to stages (not shown) similar to the stages $m_6$-$m_{11}$.

What is claimed is:

1. A numerically controlled machine to be put into operation by command data stored in a command store, said machine comprising a machine section, reading means for reading said command store to derive command signals representative of said command data, and a numerical control device responsive to said command data for putting said machine section into operation, said numerical control device comprising a microprogrammable computer which comprises:

memory means comprising, in turn, first memory means for storing therein said command data, second memory means for storing therein first results of calculation, and third memory means for storing therein a macroprogram composed of a sequence of macroinstructions;

a control memory for storing a first microprogram composed of a sequence of first microinstructions and a second microprogram composed of a sequence of a second microinstructions;

control means coupled to said reading means, said first through third memory means, and said control memory for storing in response to said command signals said command data in said first memory means, for executing at a first rate said macroinstructions in response to said first microinstructions to successively derive said first results of calculation from the command data stored in said first memory means and to store the successively calcuaed first results of calculation in said second memory means, and for executing at a second rate faster than said first rate said second microinstructions to derive second results of calculation from the successively calculated and stored first results of calculation; and operation means responsive to said second results of calculation for putting said machine section into operation.

2. A numerically controlled machine as claimed in claim 1, said macroinstructions comprising first macroinstructions and second macroinstructions in sequence, wherein said memory means comprises fourth memory means for storing therein a flag datum settable into one of two states at a time, said control means being coupled to said fourth memory means and capable of referring to said flag datum in response to said first microinstructions to execute said second microinstructions and thereafter to execute said first macroinstructions in response to said first microinstructions when said flag datum is set in a predetermined one of said two states and of executing said second macroinstructions in response to said first microinstructions when said flag datum is set in the other of said two states.

3. A numerically controlled machine as claimed in claim 2, said second macroinstructions comprising a first preselected macroinstructions, said second microinstructions comprising a sequence of interpolation microinstructions, said control means being capable of executing said first preselected macroinstruction in response to said first microinstructions to derive said predetermined one state and store said predetermined one state in said fourth memory means, said control means successively executing said interpolation microinstructions when said flag datum is set in said predetermined one state.

4. A numerically controlled machine as claimed in claim 3, said second macroinstructions comprising a second preselected macroinstructions prior to said first preselected macroinstruction, said interpolation microinstructions being a sequence of linear interpolation microinstructions, wherein said memory means comprises fifth memory means for storing therein a second flag datum settable in one of two states at a time, said control means being coupled to said fifth memory means and capable of executing said second macroinstructions in response to said first microinstructions to derive a predetermined one of the two states of said second flag datum and store the last-mentioned predetermined one state in said fifth memory means, said control means being further capable of referring to said second flag datum in response to a first one of said linear interpolation microinstructions, said control means successively executing remaining ones of said linear interpolation microinstructions when said second flag datum is set in the last-mentioned predetermined one state and interrupting further execution of said remaining linear interpolation microinstructions when said second flag datum is set in the other state thereof.

5. A numerically controlled machine as claimed in claim 4, said second macroinstructions comprising a third preselected macroinstruction prior to said second preselected macroinstruction and a fourth preselected macroinstruction between said second and first preselected macroinstructions, wherein said memory means comprises sixth memory means for storing therein normalized current end point data and seventh memory means for storing therein linear interpolation data, said control means being coupled to said sixth memory means and capable of executing said third preselected macroinstruction in response to said first microinstructions to derive said normalized current end point data from said command data stored in said first memory means and storing the calculated current end point data in said sixth memory means, said control means being coupled to said seventh memory means and further capable of executing said fourth preselected macroinstruction in response to said first microinstructions to clear said seventh memory means, said control means executing said linear interpolation microinstructions to successively derive new linear interpolation data from the current end point data stored in said sixth memory means and the content of said seventh memory means and store the new linear interpolation data in said seventh memory means.

6. A numerically controlled machine as claimed in claim 5, said remaining second microinstructions comprising a predetermined microinstruction at the last of the sequence, said control means executing said predetermined microinstruction to derive said other state of said second flag datum and store the derived state in said fourth memory means.

7. A numerically controlled machine as claimed in claim 6, said control means sequentially executing said first and second macroinstructions to said first preselected macroinstruction referring to said first flag datum each time one of the macroinstructions prior to said first preselected macroinstruction executed.

* * * * *

UNITED STATES PATENT AND TRADEMARK OFFICE
CERTIFICATE OF CORRECTION

PATENT NO. : 4,118,776
DATED : October 3, 1978
INVENTOR(S) : Masayoshi ISOMURA

It is certified that error appears in the above-identified patent and that said Letters Patent are hereby corrected as shown below:

IN THE CLAIMS:

Column 10, line 43 - delete "macroinstructions" insert -- macroinstruction -- line 55 - delete "macroinstructions" insert -- macroinstruction -- line 63 - delete "structions" insert -- struction --

Signed and Sealed this

Sixth Day of February 1979

[SEAL]

Attest:

RUTH C. MASON
Attesting Officer

DONALD W. BANNER
Commissioner of Patents and Trademarks